(12) United States Patent
Barish et al.

(10) Patent No.: US 11,715,235 B2
(45) Date of Patent: Aug. 1, 2023

(54) METHODS AND APPARATUS FOR RECORDING IMPACT EVENTS ASSOCIATED WITH TRAILER MONITORING UNITS

(71) Applicant: ZEBRA TECHNOLOGIES CORPORATION, Lincolnshire, IL (US)

(72) Inventors: Justin F. Barish, Kings Park, NY (US); Adithya H. Krishnamurthy, Hicksville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 267 days.

(21) Appl. No.: 17/067,023

(22) Filed: Oct. 9, 2020

(65) Prior Publication Data

US 2021/0027495 A1 Jan. 28, 2021

Related U.S. Application Data

(63) Continuation of application No. 16/217,837, filed on Dec. 12, 2018, now Pat. No. 10,803,620.

(51) Int. Cl.
*G06T 7/80* (2017.01)
*G01C 9/06* (2006.01)
*H04N 7/18* (2006.01)
*G06T 7/70* (2017.01)

(52) U.S. Cl.
CPC .............. *G06T 7/80* (2017.01); *G01C 9/06* (2013.01); *G06T 7/70* (2017.01); *H04N 7/183* (2013.01); *G01C 2009/066* (2013.01); *G06T 2207/30244* (2013.01)

(58) Field of Classification Search
USPC ....................................................... 701/32.2
See application file for complete search history.

(56) References Cited

U.S. PATENT DOCUMENTS

| | | |
|---|---|---|
| 9,290,202 B2 | 3/2016 | Lavoie |
| 9,956,965 B1 | 5/2018 | Hall et al. |
| 10,803,620 B2 * | 10/2020 | Barish ...................... G06T 7/73 |
| 2016/0049020 A1 | 2/2016 | Kuehnle et al. |
| 2016/0121790 A1 | 5/2016 | Mains, Jr. |
| 2016/0144817 A1 * | 5/2016 | Chambers ............ G07C 5/0841 340/436 |
| 2017/0185852 A1 * | 6/2017 | Pliefke ............... H04N 5/23293 |

(Continued)

*Primary Examiner* — Tyler D Paige

(57) ABSTRACT

An example trailer monitoring system includes a trailer monitoring unit (TMU) that has an image capture arrangement disposed within the TMU, the image capture arrangement to capture first image data, and an accelerometer carried by the TMU, the accelerometer to generate acceleration data of the TMU. The system also has one or more processors configured to access the acceleration data and configured to compare the acceleration data to a reference acceleration data range to determine if the acceleration data is within the reference acceleration range, in response to the acceleration data being outside the reference acceleration data range, the one or more processors are to record an impact event associated with the TMU being impacted, and in response to the acceleration data being outside the reference acceleration data range, the one or more processors are to generate a message associated with the impact event.

8 Claims, 4 Drawing Sheets

(56) References Cited

U.S. PATENT DOCUMENTS

| | | | |
|---|---|---|---|
| 2018/0370408 A1* | 12/2018 | Williams | B60P 1/283 |
| 2019/0064831 A1* | 2/2019 | Gali | G05D 1/0214 |
| 2019/0197716 A1 | 6/2019 | Trajkovic et al. | |
| 2019/0199999 A1 | 6/2019 | Krishnamurthy et al. | |
| 2019/0242700 A1 | 8/2019 | Booij et al. | |
| 2020/0193639 A1 | 6/2020 | Barish et al. | |

* cited by examiner

METHODS AND APPARATUS FOR RECORDING IMPACT EVENTS ASSOCIATED WITH TRAILER MONITORING UNITS

CROSS-REFERENCE TO RELATED APPLICATIONS

This application is a continuation of U.S. patent application Ser. No. 16/217,837, filed on Dec. 12, 2018, and incorporated herein by reference in its entirety.

BACKGROUND

Three-dimensional (3D) sensors are used to measure loads within vehicle trailers and shipping containers. 3D sensors, for example, measure distances from a back-wall of a trailer/container to the nearest load-wall inside that trailer/container. From these distances, operators can determine such metrics as the available storage space within a volume. The accuracy of these metrics is dependent on the 3D sensors and/or an associated trailer monitoring unit being calibrated.

Accordingly, there remains a demand for continued design improvements in the field of accurately calibrating sensors and/or trailer monitoring units.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed examples, and explain various principles and advantages of those embodiments.

Figure 1:
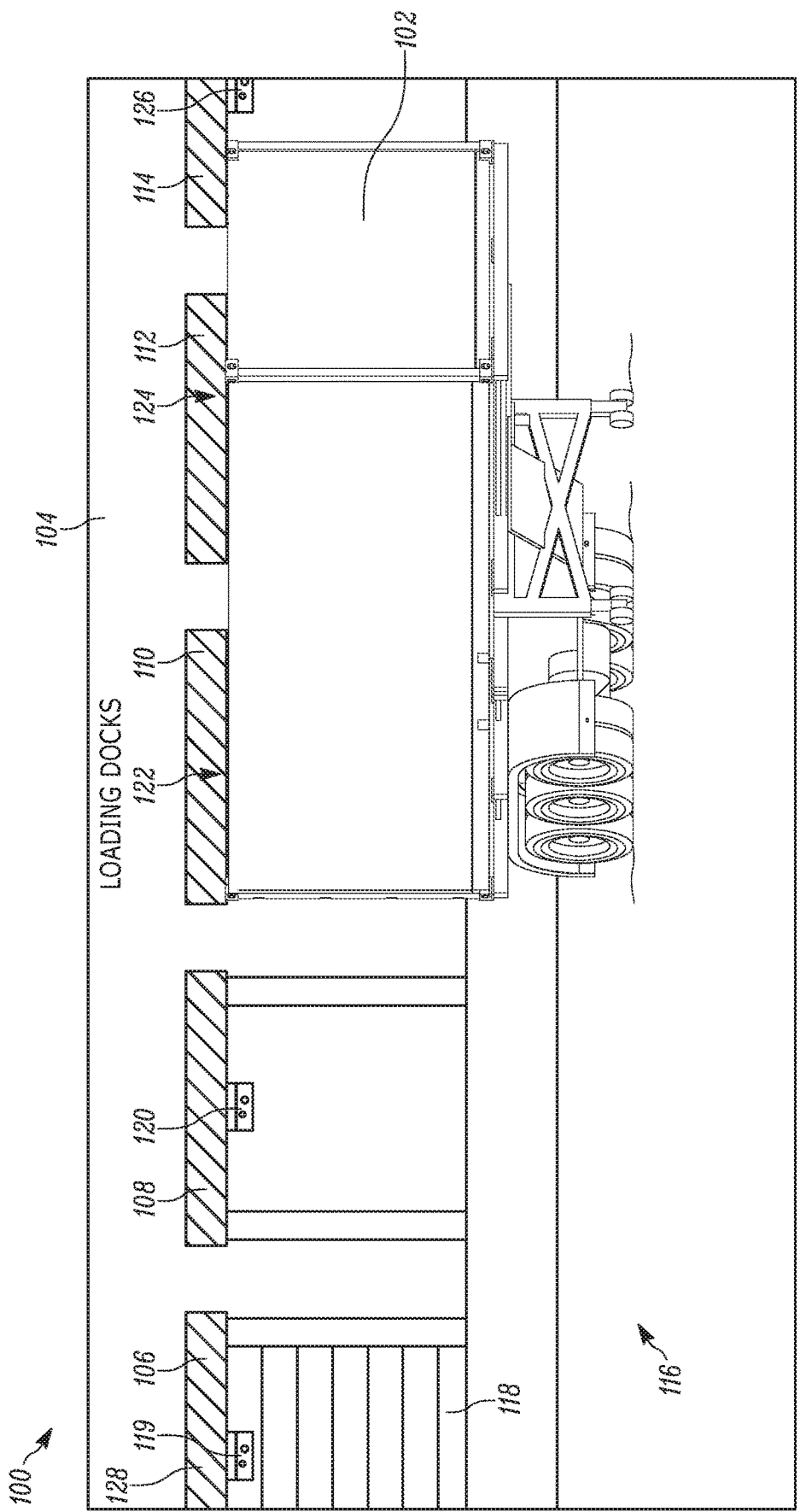
FIG. 1 illustrates an exterior of a loading facility including an example trailer monitoring system in accordance with the teachings of this disclosure.

The apparatus and method components have been represented where appropriate by conventional symbols in the drawings, showing only those specific details that are pertinent to understanding the disclosed examples so as not to obscure the disclosure with details that will be readily apparent to those of ordinary skill in the art having the benefit of the description herein.

DETAILED DESCRIPTION

The examples disclosed herein relate to trailer monitoring units (TMUs) and related systems. TMUs such as the ones disclosed herein can be used to generate metrics associated with how efficiently containers are loaded. A definition of the term "container" is provided below. To ensure that the metrics provided by these TMUs are accurate, the TMUs are calibrated. One calibration parameter includes the pitch that the TMU is mounted. The TMU (or a processor in communication with the TMU) uses the pitch value to rotate image data obtained by the TMU to substantially account for (or remove) the angle included in the image data based on how the TMU is mounted relative to the loading bay and the container. In other words, the processing corrects for a skew in the image data obtained by the TMU and caused by the pitch.

While TMUs are periodically calibrated to ensure that accurate metrics are generated, where the TMUs are mounted within the container loading area makes them susceptible to being impacted by loading equipment (e.g., a fork lift) between these scheduled calibrations. When a TMU is impacted, the pitch angle can change and, thus, any metrics determined using the pitch angle of the TMU prior to impact may be erroneous. To ensure that the example TMUs continue to generate accurate metrics even if an impact occurs, the examples disclosed herein measure the pitch of the TMU in real time and use the determined pitch value to automatically recalibrate the TMU should the pitch value change. Thus, using the disclosed examples, TMUs are continuously calibrated based on real-time measured values.

The parameter value(s) can be obtained using an accelerometer that is carried by the TMU. As used herein, the phrase "carried by the TMU" in regards to the accelerometer means that the accelerometer is disposed within the TMU or otherwise coupled to the TMU. For example, the accelerometer can be coupled to an exterior surface of the TMU. The accelerometer may be a 1-axis accelerometer, a 2-axis accelerometer or a 3-axis accelerometer.

The accelerometers generate counts associated with the position of the accelerometer. To substantially ensure that a stable reading is obtained by the accelerometer, in some examples, a number of counts may be averaged. To determine a pitch value from the average count value, in some examples, a trigonometric formula can be used after the average count value is converted into "g's."

While the disclosed examples can automatically recalibrate the TMU to account for changes in, for example, the pitch angle, if the pitch angle is outside of a pitch angle range, maintenance may be required. To determine when such maintenance may be required, the determined parameter value(s) can be compared to a reference parameter value range. The reference parameter range may be +/−3°. However, different ranges may be used depending on the application, etc.

If the parameter value(s) is outside of the reference parameter range, an alert may be generated. The alert may indicate that the TMU is to be recalibrated. Additionally or alternatively, such alerts may advantageously be used to assist an operator when installing the example TMUs. In such examples, if a parameter value(s) is within an acceptable reference parameter range, a first indication may be provided and, if the parameter value(s) is outside of the acceptable reference parameter range, a second indication may be provided. The first indication may convey to an installer that the TMU is properly positioned and the second indication may convey to the installer that the TMU is not properly positioned. Real-time feedback is provided via the alerts that decreases the likelihood that inaccurate metrics are generated and thereafter relied on and/or increases the speed associated with properly installing/calibrating the example TMUs.

In a first example, a trailer monitoring system includes a trailer monitoring unit. The trailer monitoring unit includes an image capture arrangement disposed within the trailer monitoring unit and an accelerometer carried by the trailer monitoring unit. The image capture arrangement is configured to capture first image data. The accelerometer is configured to generate acceleration data of the trailer monitoring unit. The trailer monitoring system includes one or more processors configured to access the acceleration data and configured to determine a pitch value of the trailer monitoring unit based on the acceleration data. The pitch value indicates a degree of deflection of the trailer monitoring unit relative to a horizontal plan. Based on the pitch value and the first image data, the one or more processors are configured to generate second image data. The second image data is generated to correct for a skew in the first image data resulting from the pitch value.

In a variation of the first example, the one or more processors are configured to compare the determined pitch value against a reference pitch value range to determine if the determined pitch value is within the reference pitch value range. In response to the determined pitch value being outside of the reference pitch value range, the one or more processors are configured to generate an alert. In a further variation of the first example, the trailer monitoring system includes a light source. In response to the alert, the one or more processors are configured to cause the light source to illuminate. In a further variation of the first example, the one or more processors are configured to access the acceleration data and are configured to compare the acceleration data against a first reference acceleration data range and against a second reference acceleration data range to determine if the acceleration data is within the first reference acceleration data range or if the acceleration data is within the second reference acceleration data range. In response to the acceleration data being within the first reference acceleration data range, the one or more processors are configured to determine that an impact event has occurred having a first level of severity. In response to the acceleration data being within the second reference acceleration data range, the one or more processors are configured to determine that an impact event has occurred having a second level of severity.

In a second example, a trailer monitoring system includes a trailer monitoring unit. The trailer monitoring unit includes an image capture arrangement disposed within the trailer monitoring unit and an accelerometer carried by the trailer monitoring unit. The image capture arrangement is configured to capture first image data. The accelerometer is configured to generate acceleration data of the trailer monitoring unit. The trailer monitoring system also includes one or more processors configured to access the acceleration data and configured to determine a pitch value of the trailer monitoring unit based on the acceleration data. The pitch value indicates a degree of deflection of the trailer monitoring unit relative to a horizontal plane. The one or more processors are configured to compare the determined pitch value to a reference pitch value range to determine if the determined pitch value is within the reference pitch value range. In response to the determined pitch value being outside of the reference pitch value range, the one or more processors are configured to generate an alert. In a variation of the second example, the trailer monitoring system includes a light source. In response to the alert, the one or more processors are configured to cause the light source to illuminate.

In a third example, a trailer monitoring system includes a trailer monitoring unit. The trailer monitoring unit includes an image capture arrangement disposed within the trailer monitoring unit and an accelerometer carried by the trailer monitoring unit. The image capture arrangement is to capture first image data. The accelerometer is to generate acceleration data of the trailer monitoring unit. The trailer monitoring system includes one or more processors configured to access the acceleration data and configured to compare the acceleration data to a reference acceleration data range to determine if the acceleration data is within the reference acceleration range. In response to the acceleration data being within the reference acceleration data range, the one or more processors are to increase a tally of impact events associated with the trailer monitoring unit being impacted. In response to the tally satisfying a threshold, the one or more processors are to generate an alert indicative of the trailer monitoring unit requiring maintenance.

In a variation of the third example, the trailer monitoring system includes a light source. In response to the alert, the one or more processors are to cause the light source to illuminate. In a further variation of the third example, the one or more processors are to access the acceleration data and to determine a pitch value of the trailer monitoring unit based on the acceleration data. The pitch value indicates a degree of deflection of the trailer monitoring unit relative to a horizontal plane. Based on the pitch value and the first image data, the one or more processors are to generate second image data. The second image data is generated to correct for a skew in the first image data resulting from the pitch value.

In a fourth example, a trailer monitoring system includes a trailer monitoring unit. The trailer monitoring unit includes an accelerometer to generate acceleration data of the trailer monitoring unit. The trailer monitoring unit also includes a direction indicator to assist an operator during an installation operation. The trailer monitoring unit also includes one or more processors configured to access the acceleration data and, based on the acceleration data, the one or more processors are to determine an angle of the trailer monitoring unit relative to a reference plane. The one or more processors are to compare the determined angle to a reference angle range to determine if the determined angle is within the reference angle range. In response to the determined angle being outside of the reference angle range, the one or more processors are configured to cause the direction indicator to emit a first indicator. The first indicator is an indication of the determined angle being outside of the reference angle range. In response to the reference angle being within the reference angle range, the one or more processors are configured to cause the direction indicator to emit a second indicator. The second indication is an indication of the determined angle being within the reference angle range.

In a variation of the fourth example, the angle is a pitch angle. The pitch angle indicates a degree of deflection of the trailer monitoring unit relative to a horizontal plane. The trailer monitoring unit also includes an image capture arrangement disposed within the trailer monitoring unit. The image capture arrangement is to capture first image data. Based on the pitch angle and the first image data, the one or more processors are to generate second image data. The second image data is generated to correct for a skew in the first image data resulting from the pitch angle.

In a fifth example, a method of installing a trailer monitoring unit includes accessing acceleration data generated by an accelerometer of the trailer monitoring unit. Based on the acceleration data, the method includes determining an angle of the trailer monitoring unit. The method also includes comparing the determined angle to a reference angle range to determine if the determined angle is within the reference angle range. When the determined angle is outside of the reference angle range, the method includes causing a direction indicator of the trailer monitoring unit to emit a first indicator. The first indicator is indicative of the determined angle being outside of the reference angle range. When the determined angle is inside of the reference angle range, the method causing the direction indicator to emit a second indicator. The second indicator is indicative of the determined angle being within the reference angle range.

In a variation of the fifth example, the angle is a pitch angle that indicates a degree of deflection of the trailer monitoring unit relative to a horizontal plane. The method also includes capturing first image data using an image capture arrangement. Based on the pitch angle and the first image data, the method includes generating second image data. The second image data is generated to correct for a skew of the first image data resulting from the pitch angle.

Referring now to the drawings, FIG. 1 illustrates an exemplary environment where the disclosed examples may be implemented. In the present example, the environment is provided in a form of a loading dock 100 (also referred to as a loading dock facility) where containers 102 are loaded with various goods and/or where various goods are unloaded from the containers 102. The loading dock 100 includes a facility 104 having a plurality of loading bays 106 through 114. The loading bays 106 through 114 face a loading facility lot 116 where vehicles, such as semis (not shown) deliver and pick up the containers 102.

To load/unload the containers 102, each container 102 is backed toward the facility 104 such that the container 102 is generally perpendicular with the wall having the loading bays 106-114, and in line with one of the loading bays 106-114. In this example, the container 102 is in line with the loading bay 110. In the illustrated example, the loading bays 106-114 include a bay door 118. The bay door 118 can be lowered to close the respective loading bay 106-114 or raised to open the respective loading bay 106-114. When the loading bays 106-114 are raised/opened, the interior of the facility 104 is accessible therethrough.

In the illustrated example, the loading bays 106-114 include trailer monitoring units (TMUs) 119, 120, 122, 124, 126. The TMUs 119-126 are mounted near the container loading area. The TMUs 119-126 are mounted in the upper section of the respective loading bays 106-114 outside of the bay door 118. As shown, the TMUs 119-126 face the loading facility lot 116 and/or an interior/rear of the container 102 if one of the containers 102 is docked at the respective loading bay 106-114. Thus, for example, once the container 102 is docketed at the loading bay 110, goods can be loaded onto/unloaded from the container 102 with the TMU 122 maintaining a view of the rear/inside of the container 102. To protect the TMUs 119-126 from inclement weather, one or more of the TMU's 119-126 can be mounted under an awning bay 128.

Figure 2:
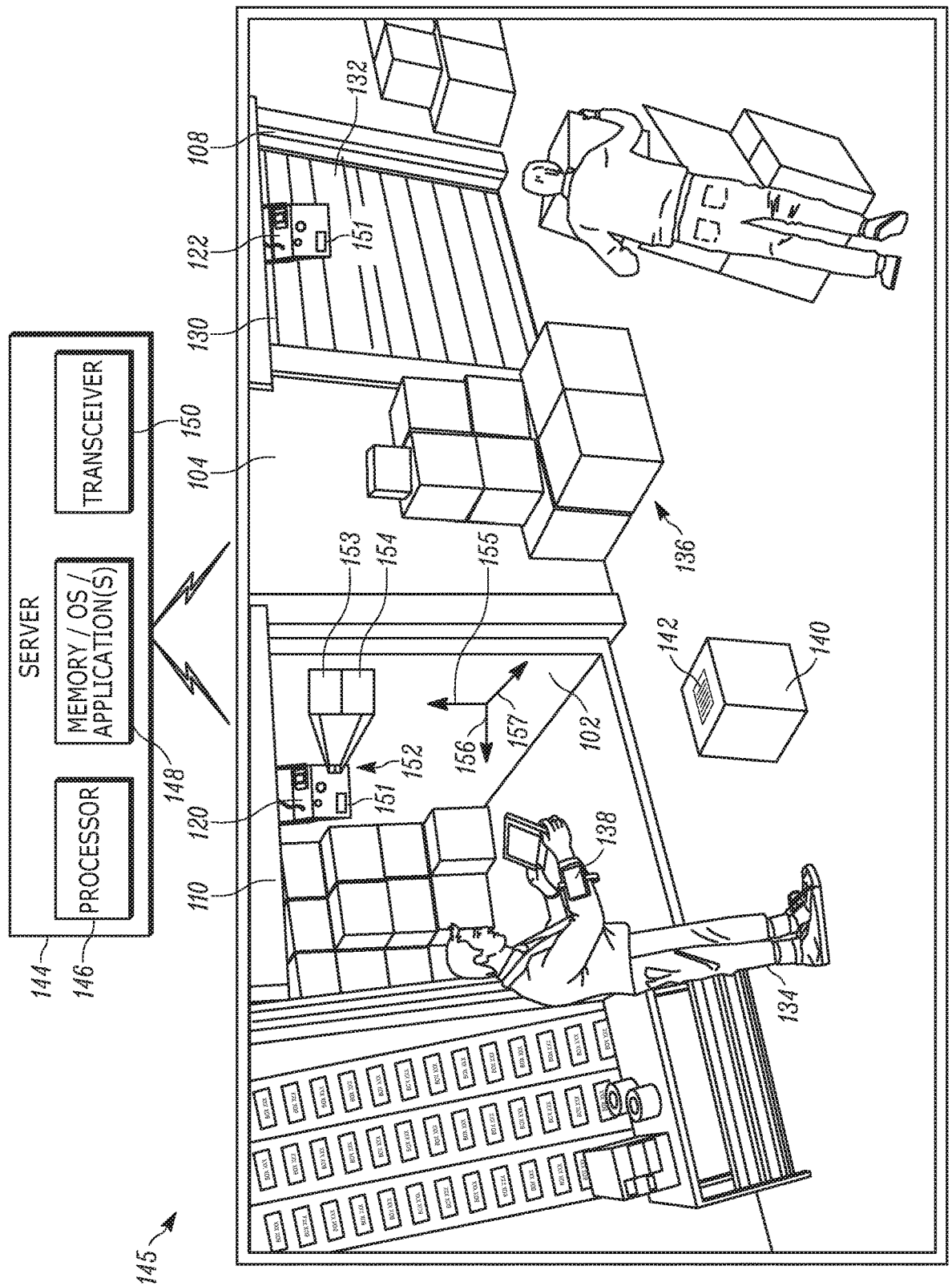
FIG. 2 illustrates an interior of the loading facility of FIG. 1.

FIG. 2 is a perspective view of the interior of the loading facility 104 of FIG. 1. In this example, the container 102 is docked at the loading bay 110 and another container 130 is docketed at the loading bay 108. A door of the container 102 is open and a door 132 of the other container 130 is closed.

To monitor the loading/unloading process and/or to help determine whether packages are properly delivered to the correct container (e.g., 102, 130), for example, the TMUs 119-126 (120 and 122 being shown) are employed. One of the TMUs 119-126 (the TMU 120) is described in greater detail in FIG. 3.

A loader 134 loads and unloads packages 136 to and from the container 102. In the illustrated example, the loader 134 is a person carrying a client device 138 implemented by a wearable computer. The client device 138 may be in the form of a mobile device. Some mobile devices that can be used to implement the client device 138 include a tablet, a smartphone, a laptop, a wearable device (e.g., a wrist-mounted device) or other such mobile computing devices. The client device 138 can be used by the loader 134 to scan the packages 136 such as package 140 as they are loaded or unloaded. In some examples, the client device 138 includes a scanner for scanning indicia 142 on the package 140. The indicia 142 may be a barcode, a universal product code, a quick read code, a radio frequency identification code or combinations thereof. Therefore, in some examples, the client device 138 includes a barcode scanner.

A server 144 is also included that is in communication with the TMUs 119-126 and the client device 138. The server 144 includes one or more processors 146 and one or more memories 148. The one or more memories 148 store applications for execution by the one or more processors 146. The server 144 also includes a transceiver 150. The transceiver 150 may be Wi-Fi transceiver for communicating with the server wearable device over a data link and/or and for communicating with the TMUs 119-126 over another data link.

To enable metrics associated with the loading/unloading process to be generated, in the illustrated example, the TMU 120 collects and/or processes three-dimensional (3D) image data and/or two-dimensional (2D) image data. The collected image data can be processed at the TMU 120 to generate metrics. Additionally and/or alternatively, the image data can be processed at the server 144 in communication with the TMU 120 and the other TMUs 119, 122, 124, 126 to generate the metrics. The metrics generated based on the image data may include fullness metrics, efficiency metrics, loading metrics and/or identifying metrics associated with alerts and measurements. While the TMU 120 is mentioned as collecting the image data that is thereafter processed, the TMUs 119, 122, 124, 126 also perform this functionality. The server 144 and the TMUs 119-126 may be referred to as a system 145. In some examples, the system 145 also includes the client device 138.

For the metrics to be accurately determined from the image data, the calibration parameters are used. One of the calibration parameters includes a degree of deflection of the trailer monitoring unit 120 relative to a horizontal plane of the loading bay 110. The degree of deflection may be referred to as a pitch value.

To ensure that the pitch value used represents the current pitch value of the TMU 120, the example TMU 120 includes an accelerometer 151. The accelerometer 151 is configured to generate acceleration data that can be used to determine a parameter value (e.g., a pitch value) of the TMU 120. The accelerometer 151 may be a 1-axis accelerometer, a 2-axis accelerometer or a 3-axis accelerometer.

To determine the pitch value of the TMU 120, the accelerometer 151 generates accelerometer counts (acceleration data). The counts can be averaged at the TMU 120 and/or at the server 144 to substantially ensure that a stable reading is obtained and/or to otherwise achieve higher accuracy of the measurements. The averaged counts are converted to G's, with one value per axis. The determined G values are used to determine the pitch angle of the TMU 120. While a pitch of the TMU 120 can be determined in different ways, for a 12-bit accelerometer, in some examples, Equation 1 is used to convert the counts generated by the accelerometer 151 into Gs.

$$Gs = ((count/16)/1024) \qquad \text{Equation 1}$$

Equation 2 can be used to determine the angle of the TMU 120, where $\bar{y}$, $\bar{x}$, $\bar{z}$ are the averaged y, x, and z axis values, in Gs.

$$\text{angle} = \tan^{-1}\left(\frac{\bar{y}}{\sqrt{\bar{x}^2 + \bar{z}^2}}\right) * \frac{180}{\pi} \qquad \text{Equation 2}$$

As mentioned above, the image data collected by the TMU 120 is processed. Some of this processing includes correcting for a skew in the image data resulting from the orientation of the TMU 120 within the loading bay 110. The "amount" of correction is directly correlated to the pitch value. While the image data can be processed in different ways, in some examples, Equation 3 is used to adjust Y-values of the 3D points in the 3D image data collected and Equation 4 is used to adjust the Z-values in the 3D points of the 3D image data.

$$(pt.y^*\cos(\text{angle})) + (pt.z^* - \sin(\text{angle})) \qquad \text{Equation 3}$$

$$(pt.y^*\sin(\text{angle})) + (pt.z^*\cos(\text{angle})) \qquad \text{Equation 4}$$

Thus, Equations 1-4 can be used to determine a pitch angle of the TMU 120 in real time base on the acceleration data from the accelerometer 151 to thereafter generate image data that adjusts for the skew.

While the disclosed examples dynamically calibrate the TMU 120, thereby accounting for changes in the pitch angle of the TMU 120, if the pitch angle is outside of a reference pitch value range, maintenance may be required to reorient the TMU 120 and/or to otherwise repair/replace the TMU 120. Reorienting the TMU 120 may be required because, for example, if the TMU 120 is 2° outside of the reference pitch value range, image data at the top of the container 102 may not be obtainable and/or is "cut off" and if the TMU 120 is 4° outside of the reference pitch value range, image data within the top two 2-feet of the container 102 may be outside of the FOV of the TMU and/or is "cut off."

To provide notice to an individual(s) that such maintenance may be required, the TMU 120 and/or the server 144 compares the determined pitch value against the reference pitch value range to determine if the determined pitch value is within the reference pitch value range. When the pitch value is outside of the reference pitch value range, in some examples, the TMU 120 and/or the server 144 generates an alert. In this example, the alert 152 is in the form of a light source 152 illuminating. The TMU 120 and/or the server 144 may cause the light source 152 to illuminate. The light source 152 is illustrated being carried by the TMU 120. However, in other examples, the light source 152 may be spaced from the TMU 120 (e.g., coupled to the side of the loading bay 110). Additionally or alternatively, the alert may be generated via a message (e.g., a text message) being conveyed to the client device 138 or in any other suitable way.

Maintenance may also be required if the TMU 120 is impacted a number of times and/or with sufficient severity. To determine if the TMU 120 has been impacted and/or to generate an alert when associated maintenance is required, the TMU 120 and/or the server 144 compares the generated acceleration data against a reference acceleration data range to determine if the generated acceleration data is within the reference acceleration data range. When the determined acceleration data is outside of the reference acceleration data range, the TMU 120 and/or the server 144 increases a tally of impact events associated with the TMU 120 being impacted. The tally may be stored in the memory 145 of the server 144 and/or a memory of the TMU 120. In some examples, an alert is generated in response to the tally satisfying a threshold. The alert may indicate that maintenance is required at the TMU 120.

To determine a severity of an impact at the TMU 120, in some examples, the TMU 120 and/or the server 144 compares the generated acceleration data against first and second reference acceleration data ranges to determine if the generated acceleration data is within the first reference acceleration data range or within the second reference acceleration range. When the generated acceleration data is within the first reference acceleration data range, an impact event having a first level of severity has occurred and, when the generated acceleration data is within the second reference acceleration data range, an impact event having a second level of severity has occurred. In response to at least one of the first impact event or the second impact event occurring, the TMU 120 and/or the server 144 increases a tally of impact events associated with the TMU 120 being impacted. As with other example disclosed above, an alert may be generated in response to the tally satisfying a threshold. Put another way, the TMU 120 and/or the server 144 can generate an alert after a particular number of impacts has occurred or after an impact having a particular severity has occurred.

When the TMU 120 is being installed on the loading bay 110, the TMU 120 is positioned to have a FOV of the container 102 that enables image data to be obtained from which desired metrics can be determined. To enable the TMU 120 to be properly positioned and to assist an operator when the TMU 120 is being installed, in some examples, the light source 152 includes a first indicator 153 and a second indicator 154. The first and second indicators 153, 154 indicate to the installer when the TMU 120 is properly oriented and/or what changes are required to properly orient the TMU 120. The first indicator 153 may be a first direction indicator and/or a first color indicator and the second indicator 154 may be a second direction indicator and/or a second color indicator.

To assist the operator during the installation process, the TMU 120 and/or the server 144 accesses acceleration data from the TMU 120 and determines an angle of the TMU 120 relative to a reference plane. The TMU 120 and/or the server 144 compares the determined angle to a reference angle range. Depending on the angle that is being determined, the reference plane may be different. For example, if the angle being determined is a yaw axis 155, a pitch axis 156 or a roll axis 157, the reference plane may be a horizontal plane, a vertical plane or a transverse plane.

When the determined angle is outside of the reference angle range, the TMU 120 and/or the server 144 causes the first indicator 153 to emit an indication. The first indicator 153 indicates that the determined angle is outside of the reference angle range. In this example, the first indicator 153 indicates to the installer via a first color light that additional adjustments are required. When the determined angle is within the reference angle range, the TMU 120 and/or the server 144 causes the second indicator 154 to emit an indication. The second indicator indicates that the determined angle is within the reference angle range. In this example, the second indicator 154 indicates to the installer via a second color light that the TMU 120 is properly positioned and/or no additional adjustments are required. While the above example mentions that the direction indicator is implemented by the light source 152 carried by the TMU 120, the direction indicator can be differently implemented. For example, the direction indicator can be an audio signal and/or a light source that is spaced from the TMU 120 and/or an indicator provided via the client device 138.

Figure 3:
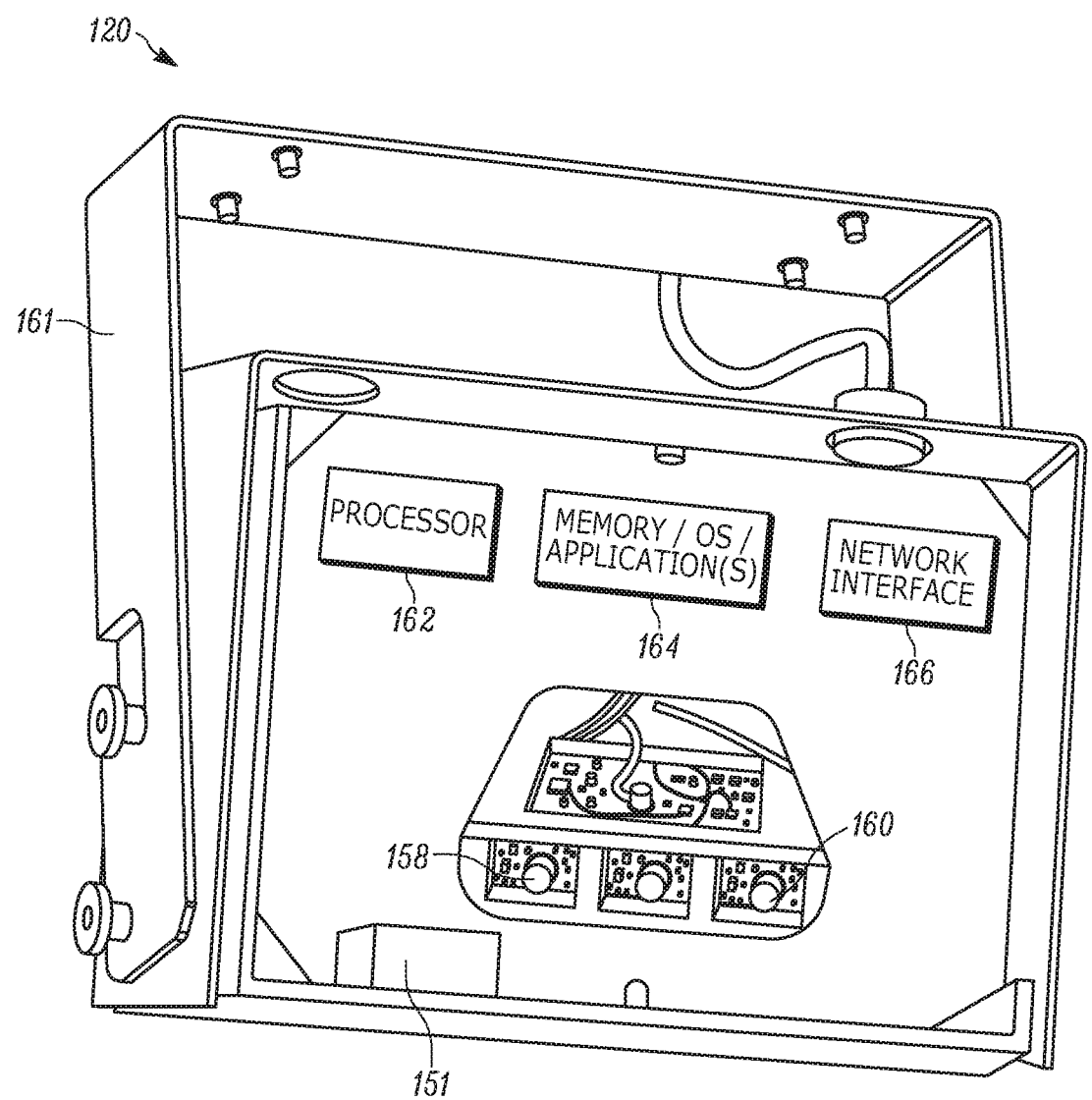
FIG. 3 illustrates an example TMU of the trailer monitoring system of FIG. 1.

Referring to FIG. 3, the TMU 120 is shown. The TMU 120 is a mountable device that includes a 3D camera (an image capture arrangement) 158 and a 2D camera (an image capture arrangement) 160. The 3D camera 158 is configured to capture three dimensional (3D) images (e.g., 3D image data including points with three-dimensional point data). In some examples, the 3D camera 158 includes an Infra-Red (IR) projected and a related IR camera, and a depth-detection application executing on one or more processors or memories of the TMU 120. The 2D camera 160 is configured to capture two dimensional (2D) images and, in some examples, includes a red, green, blue (RGB) based camera for capturing 2D images having RGB-based pixel data.

The TMU 120 also includes a mounting bracket 161. As shown in FIGS. 1 and 2, the TMU 120 is mounted via the mounting bracket 161. Further, the TMU 120 is shown being oriented in the direction of the docked container 102 to capture 3D image data and/or 2D image data of the interior and/or the exterior of the container 102.

In the illustrated example, the TMU 120 includes one or more processors 162 and one or more computer memories 164. The one or more processors 162 can be used to execute applications and/or instructions that perform analytics or other functions disclosed herein. The one or more memories 164 can be used to store image data, for example. Additionally or alternatively, in some examples, the TMU 120 includes a flash memory used for determining, storing and/or otherwise processing the image data and/or post-scanning data. To enable communication with other devices such as, for example, the server 144, the TMU 120 includes a network interface 166. The network interface 166 may include any suitable type of communication interfaces(s) (e.g., wired and/or wireless interface) configured to operate in accordance with any suitable protocol(s).

Figure 4:
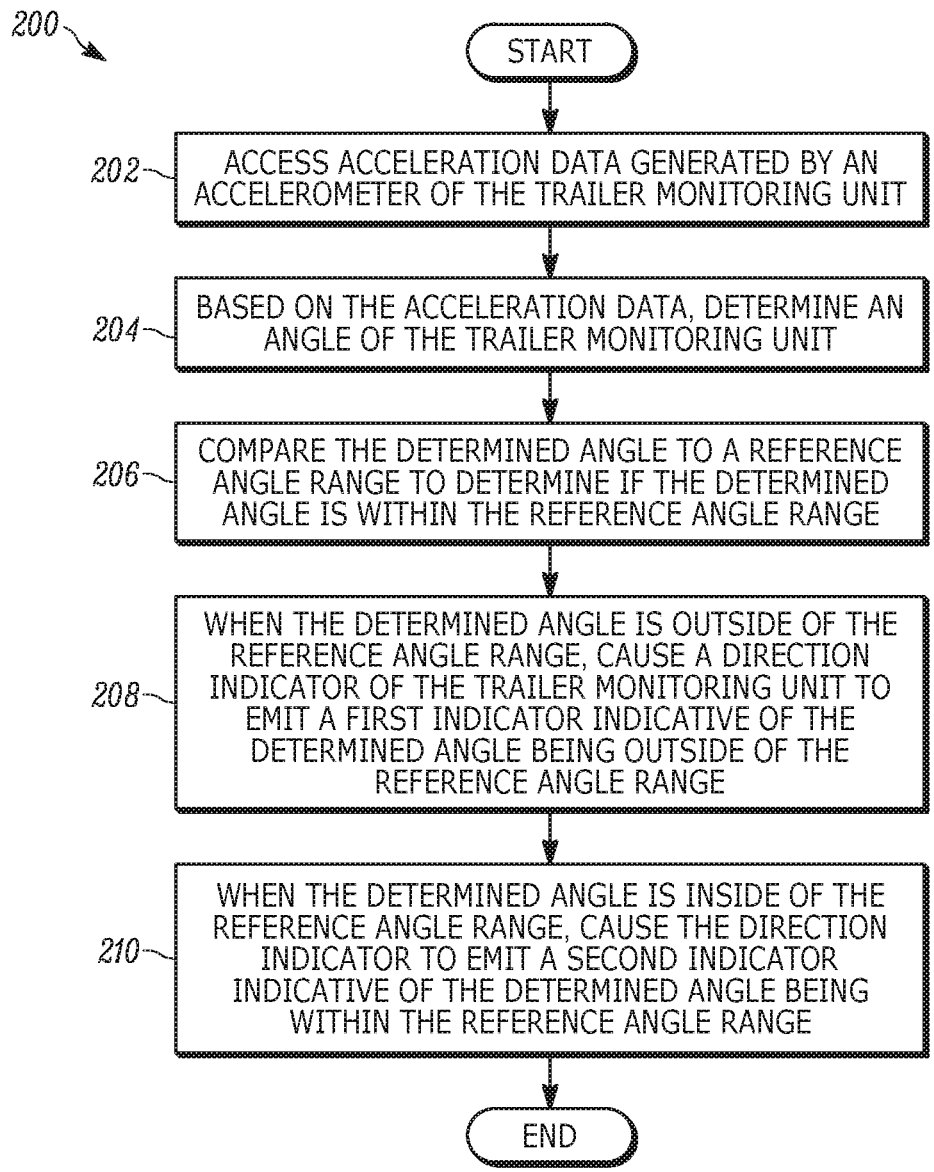
FIG. 4 illustrates a flowchart representative of a method of installing a TMU as implemented by the trailer monitoring system of FIG. 1, in accordance with the teachings of this disclosure.

FIG. 4 illustrates a flowchart for performing a method of assisting an operator install the TMU 120, as implemented by the system 145 of FIG. 2. A process 200 begins at block 202 when acceleration data is accessed. The acceleration data may be generated via the accelerometer 151 carried by the TMU 120 and the acceleration data may be accessed via the TMU 120 or via the server 144. At block 204, based on the acceleration data, an angle of the TMU 120 is determined relative to a reference plane. In examples in which the determined angle is a pitch angle, the reference axis is associated with a horizontal plane.

At block 206, the determined angle is compared by, for example, the TMU 120 and/or the server 144, to a reference angle range to determine if the measured angle is within the reference angle range. The reference angle range may be stored in the memory 148 of the server 144 and/or the memory 164 of the TMU 120. At block 208, when the determined angle is outside of the reference angle range, the TMU 120 and/or the server 144 causes the direction indicator of the TMU 120 to emit a first indicator. The first indicator indicates that the determined angle is outside of the reference angle range. The first indicator may be a first color light emitted by the first indicator 153 (e.g., red). However, when the determined angle is inside of the reference angle range, the TMU 120 and/or the server 144, at block 210, causes the direction indicator of the TMU 120 to emit a second indicator. The second indicator indicates that the determined angle is within the reference angle range. The second indicator may be a second color light emitted by the second indicator 154 (e.g., green). Thus, when an individual is installing the TMU 120 at the loading bay 110, real-time positioning feedback may be received about the orientation of the TMU 120 relative to installation guidelines (e.g., within the reference angle range) that advantageously assists the individual during the operation.

From the foregoing, it will be appreciated that the above disclosed apparatus, methods and articles of manufacture enable trailer monitoring units (TMU) to be dynamically calibrated (and recalibrated) in real time. Thus, metrics determined using this up-to-date calibration data are more accurate than if the calibration data does not represent the current and actual position of the TMU. Moreover, the examples disclosed herein provide alerts when the TMUs are outside of a reference angle range. Some of these alerts can be used to provide a notification that one of a plurality of TMUs, for example, has been impacted by a fork truck and is out of alignment (e.g., maintenance is required). Some of these alerts can be used to assist an installer installing the TMUs by providing feedback as how to adjust the TMU to achieve a desired FOV within a container, for example.

As used herein, the term "container" shall refer to any container transportable by at least one of a vehicle, a train, a marine vessel, and airplane, and configured to store transportable goods such as boxed and/or unboxed items and/or other types of freight. Accordingly, an example of a container includes an enclosed container fixedly attached to a platform with wheels and a hitch for towing by a powered vehicle. An example of a container also includes an enclosed container removably attached to a platform with wheels and a hitch for towing by a powered vehicle. An example of a container also includes an enclosure that is fixedly attached to a frame of a powered vehicle, such as the case may be with a delivery truck, box truck, etc. As such, while the exemplary embodiment(s) described below may appear to reference one kind of a container, the scope of the invention shall extend to other kinds of container, as defined above. Furthermore, the term "trailer" is an example of application of a container, in particular, a container used with a vehicle, such as a powered vehicle, like a delivery truck, box truck, etc.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The legal scope of the property right is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A trailer monitoring system, comprising:
   a trailer monitoring unit, including:
      an image capture arrangement disposed within the trailer monitoring unit, the image capture arrangement to capture first image data; and
      an accelerometer carried by the trailer monitoring unit, the accelerometer to generate acceleration data of the trailer monitoring unit; and
   one or more processors configured to access the acceleration data and configured to compare the acceleration data to a reference acceleration data range to determine if the acceleration data is within the reference acceleration range,
   in response to the acceleration data being outside the reference acceleration data range, the one or more processors are to record an impact event associated with the trailer monitoring unit being impacted, and
   in response to the acceleration data being outside the reference acceleration data range, the one or more processors are to generate a message associated with the impact event.

2. The trailer monitoring system of claim 1, further including a light source, and wherein in response to the message, the one or more processors are to cause the light source to illuminate.

3. The trailer monitoring system of claim 1, wherein the one or more processors are to access the acceleration data and to determine a pitch value of the trailer monitoring unit based on the acceleration data, wherein the pitch value indicates a degree of deflection of the trailer monitoring unit relative to a horizontal plane, and wherein based on the pitch value and the first image data, the one or more processors are to generate second image data, the second image data being generated to correct for a skew in the first image data resulting from the pitch value.

4. The trailer monitoring system of claim 1, wherein at least a portion of the one or more processors is housed within the trailer monitoring unit.

5. The trailer monitoring system of claim 1, wherein the acceleration data includes a pitch value of the trailer monitoring unit, wherein the pitch value indicates a degree of deflection of the trailer monitoring unit.

6. The trailer monitoring system of claim 5, wherein the one or more processors are configured to compare the determined pitch value against a reference pitch value range to determine if the determined pitch value is within the reference pitch value range, in response to the determined pitch value being outside of the reference pitch value range, the one or more processors are configured to generate an alert.

7. The trailer monitoring system of claim 1, wherein the one or more processors are configured to access the acceleration data and configured to compare the acceleration data against a first reference acceleration data range and against a second reference acceleration data range to determine if the acceleration data is within the first reference acceleration data range or if the acceleration data is within the second reference acceleration data range,
- in response to the acceleration data being within the first reference acceleration data range, the one or more processors are configured to determine that an impact event has occurred having a first level of severity, and
- in response to the acceleration data being within the second reference acceleration data range, the one or more processors are configured to determine that an impact event has occurred having a second level of severity.

8. The trailer monitoring system of claim 1, the first image data is 3D image data.

\* \* \* \* \*